US012585258B2

(12) United States Patent
Moser et al.

(10) Patent No.: US 12,585,258 B2
(45) Date of Patent: Mar. 24, 2026

(54) SYSTEM FOR PROCESSING INPUT DATA FROM A FOOD HANDLING LINE TO DETERMINE TRIGGER DATA FOR SAMPLING, AND A METHOD THEREOF

(71) Applicant: Tetra Laval Holdings & Finance S.A., Pully (CH)

(72) Inventors: Maurizio Moser, Correggio (IT); Lorenzo Tacconi, Modena (IT); Werther Chierici, Spilamberto (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 771 days.

(21) Appl. No.: 17/907,599

(22) PCT Filed: Mar. 31, 2021

(86) PCT No.: PCT/EP2021/058429
§ 371 (c)(1),
(2) Date: Sep. 28, 2022

(87) PCT Pub. No.: WO2021/198329
PCT Pub. Date: Oct. 7, 2021

(65) Prior Publication Data
US 2023/0146418 A1    May 11, 2023

(30) Foreign Application Priority Data

Apr. 3, 2020    (EP) ..................................... 20167929

(51) Int. Cl.
*G05B 19/418* (2006.01)

(52) U.S. Cl.
CPC ................. *G05B 19/41865* (2013.01); *G05B 2219/32353* (2013.01)

(58) Field of Classification Search
CPC .... G05B 19/41865; G05B 2219/32353; G05B 2219/25413; G05B 19/045; Y02P 90/02; Y02P 90/80
See application file for complete search history.

(56) References Cited

U.S. PATENT DOCUMENTS

| | | | |
|---|---|---|---|
| 5,754,823 A | 5/1998 | Mudryk, Jr. et al. | |
| 10,289,093 B1 | 5/2019 | Lysaght et al. | |
| | (Continued) | | |

FOREIGN PATENT DOCUMENTS

| | | |
|---|---|---|
| CN | 105301991 A | 2/2016 |
| CN | 109844663 A | 6/2019 |
| | (Continued) | |

OTHER PUBLICATIONS

International Search Report and Written Opinion of PCT/EP2021/058429, Dated Jun. 4, 2021 in 9 pages.

*Primary Examiner* — Eric J Yoon
(74) *Attorney, Agent, or Firm* — Knobbe, Martens, Olson & Bear, LLP

(57) ABSTRACT

A system (900) for processing input data (912) received from a food handling line (902) to determine trigger data (938) for sampling is provided. The system comprises a transceiver (914), a processor (916) and a memory (918). The transceiver (914) is configured to receive the input data (912) and transmit the trigger data (938). The processor (916) is configured to execute a first trigger block function (920) configured to receive first input parameter data (924) and transmit first output parameter data (926), a second trigger block function (922) configured to receive second input parameter data (928) and transmit second output parameter data (930), wherein the input data (912) comprises the first input parameter data (924) and the second input parameter data (928), and the trigger data (940)

(Continued)

comprises the first output parameter data (926) and the second output parameter data (930).

13 Claims, 9 Drawing Sheets

(56)                References Cited

U.S. PATENT DOCUMENTS

| | | | | |
|---|---|---|---|---|
| 2011/0161926 A1* | 6/2011 | Cruise | ..................... | G06F 8/35 |
| | | | | 717/113 |
| 2011/0296964 A1* | 12/2011 | Muller | .................. | B26D 5/007 |
| | | | | 83/651 |
| 2013/0117350 A1* | 5/2013 | Beck | ..................... | G06F 9/4843 |
| | | | | 709/203 |
| 2014/0121861 A1* | 5/2014 | Mood | ................ | G06F 9/44505 |
| | | | | 701/3 |
| 2016/0147205 A1 | 5/2016 | Kaufman | | |
| 2017/0031336 A1 | 2/2017 | Lehane | | |
| 2017/0060114 A1 | 3/2017 | Barford et al. | | |
| 2017/0329298 A1 | 11/2017 | Moruzzi et al. | | |
| 2018/0011454 A1 | 1/2018 | Kaufman | | |
| 2020/0150643 A1* | 5/2020 | Cella | .................... | G06N 3/047 |
| 2020/0398447 A1* | 12/2020 | Hirose | ................... | B25J 19/06 |

FOREIGN PATENT DOCUMENTS

| | | |
|---|---|---|
| CN | 110073301 A | 7/2019 |
| EP | 3193177 | 7/2017 |
| KR | 2005-0019824 A | 3/2005 |

* cited by examiner

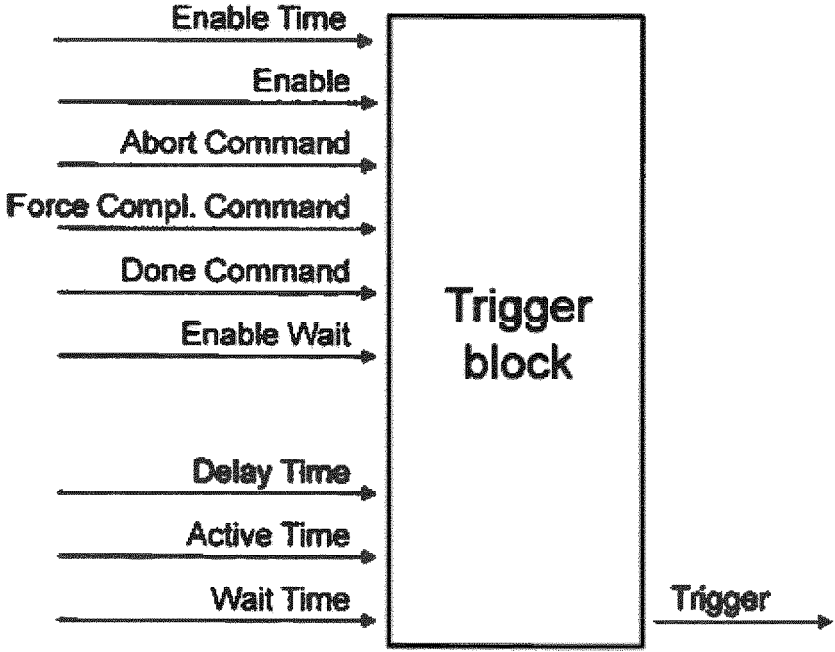

*Fig. 2*

| Name | Type | Default value when no symbol | OnChange & when true | Note |
|------|------|------------------------------|----------------------|------|
| Enable Time | Expr. (Bool) | Null | No | Enable the sequence at specific time of the day when configured to an expression of symbols "True" and "False" are invalid values in expression |
| Enable | Expr. (Bool) | True | Yes | Enable the sequence to start the trigger up to "Complete" |
| Abort | Expr. (Bool) | False | No | Force the reset of the trigger block to "Off" and timers |
| Force Complete | Expr. (Bool) | False | Yes | Force to "Complete" despite the "Active Time" |
| Done | Expr. (Bool) | True | No | If configured to a symbol interlock between "Complete" and "Wait" |
| Enable Wait | Expr. (Bool) | True | Yes | Enable retentive Wait timer if "true" behave as timer on delay |
| Delay Time | Integer | 0 (= disabled) | - | Delay from "Starting" to "Active" |
| Active Time | Integer | 0 (= disabled) | - | Delay from "Active" to "Complete" |
| Wait Time | Integer | 0 (= disabled) | - | Delay from "Complete" to "Off" |
| Trigger | String | | - | Output |

*Fig. 3*

Receiving input data — 1002

Feeding to first block function — 1004

Executing first block function — 1006

Feeding to second block function — 1008

Executing second block function — 1010

Combining into trigger data — 1012

1000

SYSTEM FOR PROCESSING INPUT DATA FROM A FOOD HANDLING LINE TO DETERMINE TRIGGER DATA FOR SAMPLING, AND A METHOD THEREOF

TECHNICAL FIELD

The invention relates to food processing and food packaging technology, more particularly to a system for processing input data received from a food handling line to determine trigger data for sampling, and a method thereof.

BACKGROUND ART

Today food handling lines, such as food processing lines and food packaging lines, are controlled by complex systems in which hardware equipment from different manufacturers are to work together in a seamless manner. In addition to being flexible in terms of manufacturers, the systems are also to be built in such a way that they are possible to be upgraded or adapted if needed.

A common approach today to provide flexibility as well as adaptability, but also reliability, is to use modules, pure software modules or combined hardware and software modules. Having this approach, it is possible to set up new systems in an expedient manner. In addition, since the different modules can be tested independently, a risk for errors can be reduced.

A specific challenge when setting up the systems is sampling, that is, how to receive input data from devices, such as sensors, provided in the food handling lines. If the hardware equipment comes from different manufacturers, this may prove to be cumbersome and time consuming for an operator to change or adapt.

Often sampling data is used for triggering different actions, which means that if the sampling is not adequately made the actions following upon the sampling will as a consequence also not be adequately made. For instance, if sampling data is related to a number of packages produced, incorrect sampling data may result in that an incorrect number of packages produced is determined, which in turn may result in that quality control checks are not performed according to agreed intervals. It is hence important that the sampling is made adequately, and that the risk of errors is reduced as much as possible.

Therefore, since it today is often not enough to have an overall understanding of the systems to assure that changing the sampling is made adequately, there is today a risk that changing the sampling cause unwanted effects that may risk an overall performance of the systems.

As outlined above, even though a module-based approach for setting up the systems for controlling the food handling lines is known on a general level, the specific challenges related to the sampling has not been addressed specifically up until this point.

SUMMARY

It is an object of the invention to at least partly overcome one or more of the above identified limitations of the prior art. In particular, it is an object to provide a system and a method for handling input data, received from devices provided in food handling devices, such that trigger data, determined based on the input data, can be determined in a reliable manner.

It has been realized that by combining two or more so-called trigger blocks, it is possible to set up the systems and methods such that the trigger data can be reliably determined based on the input data. Since the two or more trigger blocks can be combined in various ways, the flexibility is provided. At the same time, since the flexibility is provided by combining the trigger blocks in different ways, the trigger blocks may individually be designed in a straight forward manner, that is, the trigger blocks may individually be of low complexity, that is, lower complexity than if the sampling were to be handled by a module not based on trigger blocks. This low complexity provides for that the trigger blocks can reliably and easily be adapted to work with different pieces of equipment.

According to a first aspect it is provided a system for processing input data received from a food handling line to determine trigger data for sampling. The system may comprise a transceiver, a processor and a memory. The transceiver may be configured receive the input data and transmit the trigger data. The processor may be configured to execute a first trigger block function configured to receive first input parameter data and transmit first output parameter data, a second trigger block function configured to receive second input parameter data and transmit second output parameter data, wherein the input data may comprise the first input parameter data and the second input parameter data, and the trigger data may comprise the first output parameter data and the second output parameter data.

An advantage with having the first and second trigger block functions and combining output from these is that the trigger data can be created in various ways with low complexity building blocks, that is, trigger blocks implemented by the first and second trigger block functions. Having these low complexity building blocks provides for that these easily can be adapted and kept updated for a wide variety of different underlying systems and interfaces.

The second input parameter data may comprise at least part of the first output parameter data.

Having the first trigger block function to feed data to the second trigger block function opens up for additional ways to trigger sampling.

The first and second block functions can have a state machine comprising Off, Starting, Active, Complete, and Wait.

The processor may further be configured to execute a third trigger block function configured to receive third input parameter data and transmit third output parameter data. The input data may comprise the first input parameter data, the second input parameter data and third input parameter data, and the trigger data may comprise the first output parameter data, the second output parameter data and the third output parameter data.

An advantage with having the third trigger block function is that sampling can be trigged in a wider variety.

The first and second input parameter data may comprise

Enable, a Boolean operator, which if set to true switches state from Off to Starting, Abort, a Boolean operator, which if set to true switches state to Off, Force Complete, a Boolean operator, which if set to true switches from Active to Complete, Done, a Boolean operator, which if set to true switches state from Complete to Wait, Delay Time, an integer, which sets delay from Starting to Active, Active Time, an integer, which sets delay from Active to Complete, and Wait Time, an integer, which sets delay from Complete to Off.

The trigger data can be transmitted to a device, such as a sensor.

The device may be configured to measure mechanical vibrations.

The trigger data may be configured to render a notification to an operator.

The food handling line may comprise a food processing line and/or a food packaging line.

According to a second aspect it is provided a method for processing input data received from a food handling line to determine trigger data for sampling. The method may comprise receiving the input data, wherein the input data comprises first input parameter data and second input parameter data, feeding the first input parameter data to a first trigger block function, executing the first trigger block function such that first output parameter data is generated, feeding the second input parameter data to a second trigger block function, executing the second trigger block function such that second output parameter data is generated, and combining the first output parameter data and the second output parameter data into the trigger data.

The same advantage and features presented with reference to the first aspect are also applicable to this second aspect.

The second input parameter data may comprise at least part of the first output parameter data.

The first and second input parameter data may comprise

Enable, a Boolean operator, which if set to true switches state from Off to Starting, Abort, a Boolean operator, which if set to true switches state to Off, Force Complete, a Boolean operator, which if set to true switches from Active to Complete, Done, a Boolean operator, which if set to true switches state from Complete to Wait, Delay Time, an integer, which sets delay from Starting to Active, Active Time, an integer, which sets delay from Active to Complete, and Wait Time, an integer, which sets delay from Complete to Off.

The trigger data may be transmitted to a device, such as a sensor.

The trigger data may be configured to render a notification to an operator.

According to a third aspect it is provided a computer program comprising instructions for implementing a method according to the second aspect, wherein said computer program is stored on a computer-readable medium.

The advantages and features described with reference to the first or second aspect also applies to this third aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1 schematically illustrates an example of how modular data loggers can be used in a food handling line.

FIG. 2 illustrates a trigger block.

FIG. 3 is a table illustrating an example of input parameter data.

DETAILED DESCRIPTION

Figure 1:
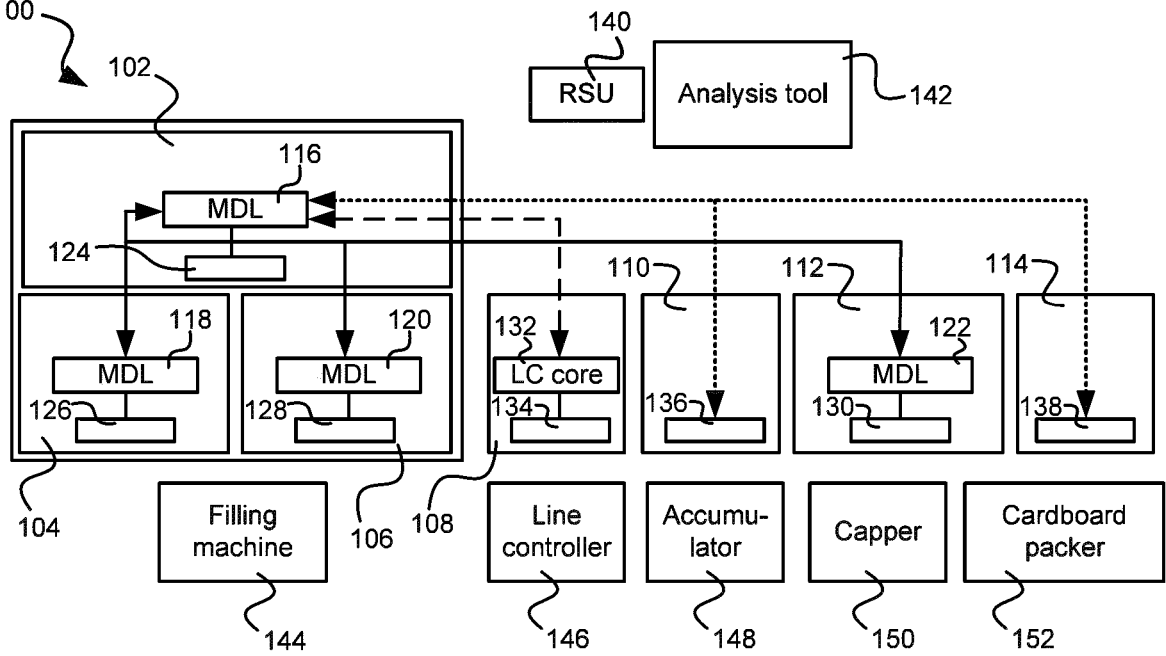

FIG. 1 generally illustrates by way of example a food handling line 100, herein exemplified as a food packaging line, from a data handling perspective.

In this particular example, it is provided a central module 102, a first filling machine module 104, a second filing machine module 106, a line controller module 108, a first downstream equipment module 110, a second downstream equipment module 112, and a third downstream equipment module 114. As illustrated, in this particular example, the central module 102 can be communicatively connected to the first filling machine module 104, the second filling machine module 106, and the second downstream equipment module 112. Communication between these modules can be achieved by a central modular data logger (MDL) 116 configured to communicate with a first filling machine MDL 118, a second filling machine MDL 120 and a second downstream equipment MDL 122 as illustrated. These MDLs 116, 118, 120, 122 may in turn comprise trigger blocks as explained below.

The MDLs 116, 118, 120, 122 may each be communicatively connected to a real time system. More particularly, the central MDL 116 may be connected to a central real time system 124, the first filling machine MDL 118 may be connected to a first filling machine real time system 126, the second filling machine MDL 120 may be connected to a second filling machine real time system 128, and the second downstream equipment MDL 122 may be connected to a second downstream equipment real time system 130.

As illustrated, in this distributed system not all modules must comprise an MDL. For instance, according to a second manner, the line controller module 108 may be provided with a different type of element, herein a line controller core element 132, which unlike the MDLs are not comprising the trigger blocks. There may be different reasons for choosing this different type of element. For instance, for the line controller module 108 it may be found beneficial to choose a different configuration to provide for that the food handling line 100 can be controlled according to pre-set requirements. In line with the MDLs, the line controller core element 132 can be communicatively connected to a line controller real time system 134.

The first downstream equipment module 110 and the third downstream equipment module 114 may be communicatively connected to the central module 102 in a third manner. In this third manner the central module MDL 116 can be communicatively connected directly with a first downstream equipment real time system 136 and a third downstream equipment real time system 138, respectively. There may be different reasons for having direct communication between the central module MDL 116 and real time systems in this way. One reason may be that there is no need for processing the input data from this part of the food handling line 100. Another reason may be that the first downstream equipment real time system 136 and the third downstream equipment real time system 138 are different from the real time systems used in other modules of the food handling line 100, and that the real time system of the first downstream equipment module 110 and the third downstream equipment module 114 are found not suitable or beneficial to be combined with an MDL.

A remote service unit (RSU) 140 and a analysis tool 142 may be provided such that the input data captured from different parts of the food handling line 100 can be presented and/or analysed by a food producer and/or a food handling line provider.

As illustrated, the first filling machine module 104 and the second filing machine module 106 may be linked to a filling machine 144, the line controller module 108 may be linked to a line controller 146, the first downstream equipment module 110 may be linked to an accumulator, the second downstream equipment module 112 may be linked to a capper 150, and the third downstream equipment module 114 may be linked to a cardboard packer 152.

As indicated above the MDLs can comprise two or more trigger blocks. An example of a trigger block is illustrated in FIGS. 2 and 3. As illustrated input parameters may be provided as well as an output parameter.

In the example illustrated in FIGS. 2 and 3, the input parameters can be one or more of:

Enable Time, a Boolean operator, which is optional, but when present and there is a transition from "False" to "True" can latch the "Enable" expression.

Enable, a Boolean operator, which if set to true switches state from Off to Starting, Abort, a Boolean operator, which if set to true switches state to Off, Force Complete, a Boolean operator, which if set to true switches from Active to Complete, Done, a Boolean operator, which if set to true switches state from Complete to Wait, Delay Time, an integer, which sets delay from Starting to Active, Active Time, an integer, which sets delay from Active to Complete, and/or Wait Time, an integer, which sets delay from Complete to Off.

Figure 4:
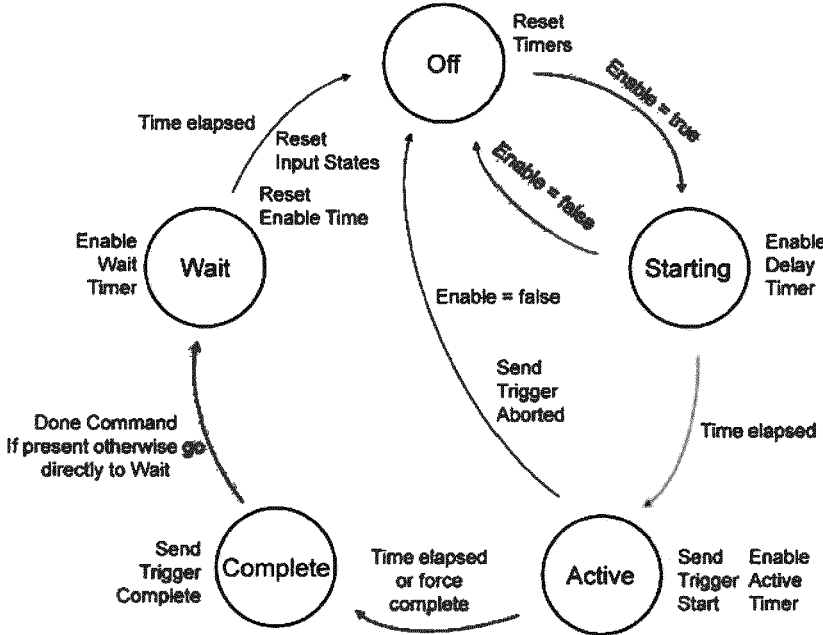
FIG. 4 illustrates a state machine.

FIG. 4 illustrates by way of example the states referred to above and how these can be related to one another. Even though a state machine as illustrated in FIG. 4 is beneficial to use, different environments may have different requirements and hence in other environments a different state machine may be found more beneficial. The concept of combining the trigger blocks is however not restricted to the state machine illustrated in FIG. 4, and the concept can be used on a broad range of state machines. Further, as illustrated, it is possible to leave out states by using Boolean parameters. Put differently, some states may be seen as optional.

To further illustrate the advantage of using combinations of trigger blocks, as illustrated in FIG. 2, three cases are presented by way of example. In a first case, illustrated in FIGS. 5A and 5B, requirements are set as follow:

Acquire 3 vibrations in sequence of 20 seconds of sampling,

Wait 10 seconds between each vibration,

Acquire after 2 minutes of continuous production,

If the production drops restart the sequence, and

Repeat the sequence 3 times a day (8 hours).

As set forth above, in this first case, vibration data is to be captured. The vibration data, that is, data representing mechanical vibrations occurring in the food handling line, can be used advantageously for e.g. preventive maintenance.

Figure 5A:
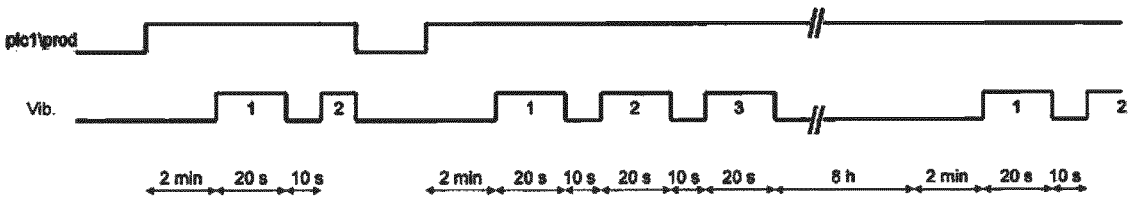
FIG. 5A-C illustrates a first case on how trigger blocks can be used for generating trigger data.

FIG. 5A illustrates by way of example how the vibration data can be captured by illustrating a production signal, "plc1/prod", and a vibration data capturing signal, "vib". The production signal "plc1/prod" is 1 when production is ongoing, and 0 when production is down. The vibration data capturing signal "vib" is 1 when the vibration data is captured, and 0 when no vibration data is captured.

As illustrated in FIG. 5A, when the production is dropped, the sequence is to be restarted. For illustrative purposes, only the first of the three times a day is illustrated.

Figure 5B:
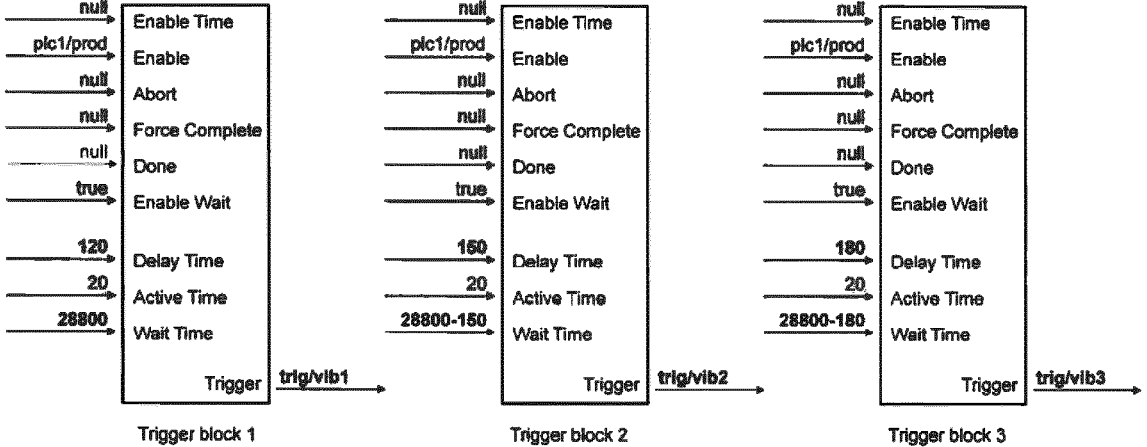
Figure 5C:
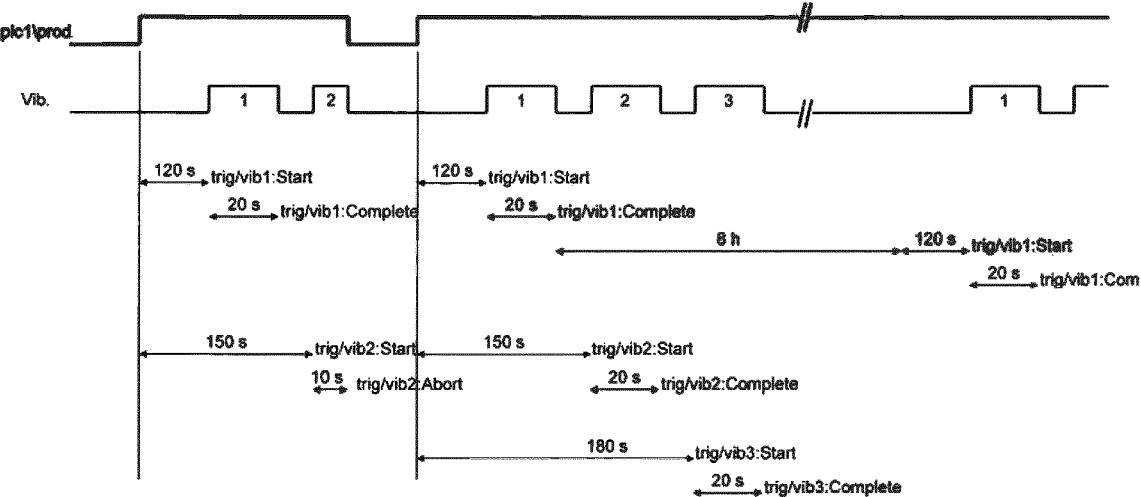

To meet the requirements presented above, three trigger blocks can be combined, as illustrated in FIG. 5B. The input parameter "Enable Time", which is optional as set forth above, is left out by being set to "null". FIG. 5C illustrates in detail how the three trigger blocks interact to meet the requirements presented above.

Figure 6A:
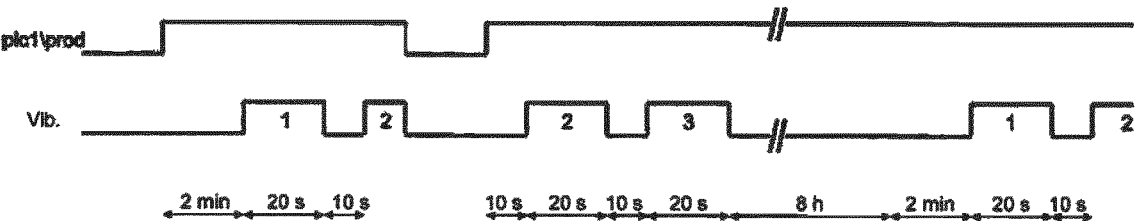
FIG. 6A-B illustrates a second case.
Figure 6B:
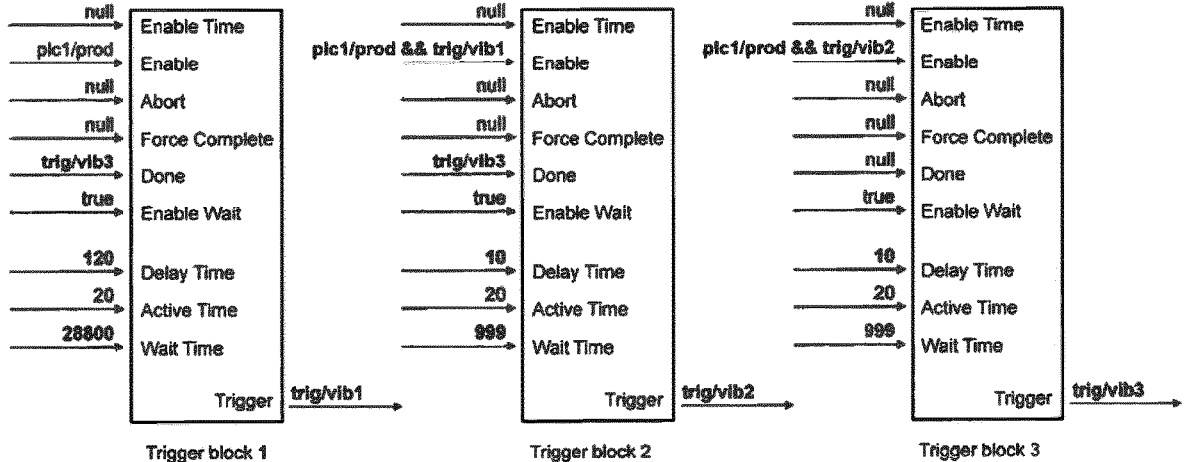

FIGS. 6A and 6B illustrate a second case in which the requirements are:

Acquire 3 vibrations in sequence of 20 seconds of sampling,

Wait 10 seconds between each vibration,

Acquire after 2 minutes of continuous production,

If the production drops continue the sequence, and

Repeat the sequence 3 times a day (8 hours).

Thus, unlike the first case, illustrated in FIG. 5A-5C, in this second case, the sequence, that is, the capturing of the vibration data, should continue, instead restart, if the production drops, that is, "plc1/prod" changing from 1 to 0.

By using the same trigger blocks, but configured differently, it is possible to meet the requirements. As illustrated in FIG. 6B, the input parameters "Enable", "Done", "Delay Time" and "Wait Time" are configured differently in this second case compared to the first case.

As illustrated, "Wait Time" for the trigger block 2 and 3 are set to 999 seconds in this example. The reason for this is to set the state machine in a hold state, or put differently a frozen state. In this particular example, this would be achieved for any number greater than 30 seconds, which is a sum of the "Delay Time" of 10 seconds and the "Trigger Time" of 20 seconds.

The "Wait Time" for the trigger block 1 is set to 28 800 seconds, which corresponds to 8 hours (8*60*60 seconds).

Figure 7A:
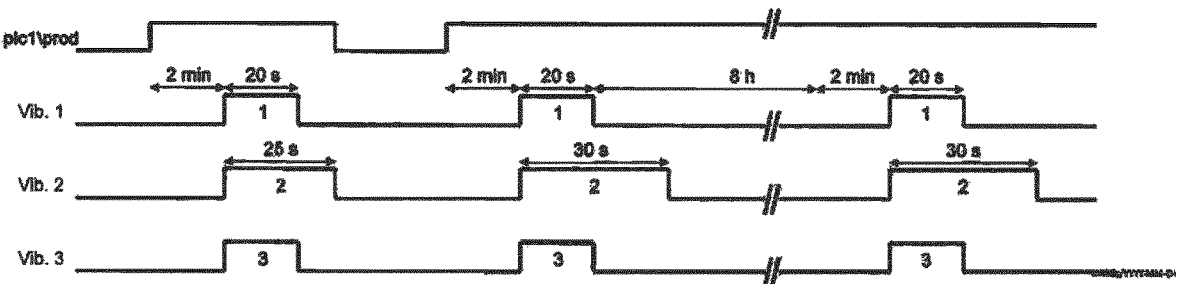
FIG. 7A-B illustrates a third case.
Figure 7B:
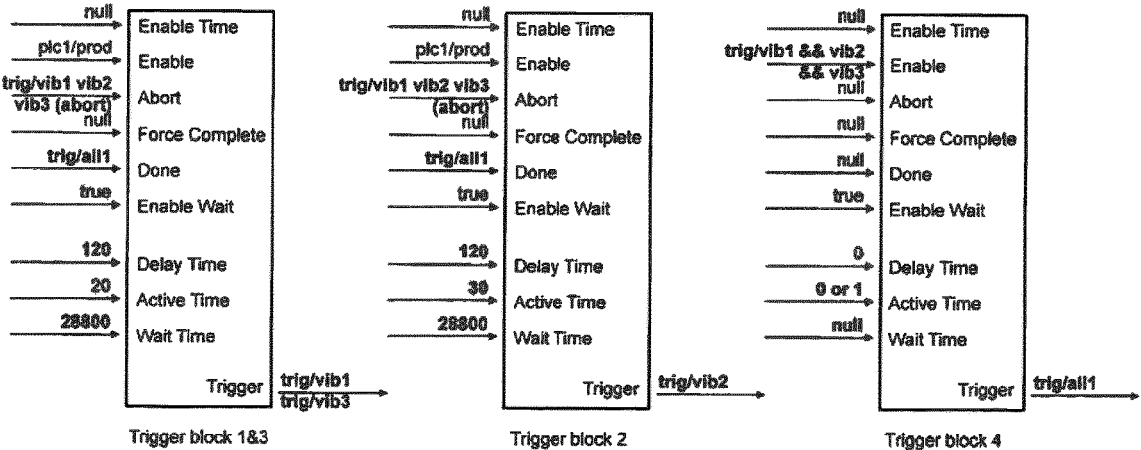

In a third case, illustrated in FIGS. 7A and 7B, the requirements are as following:

Acquire 2 vibrations in parallel of 20 seconds of sampling and 1 of 30 seconds,

Acquire after 2 minutes of continuous production,

If the production drops restart the sequence,

The capturing is considered done properly only if all the samplings are complete, and Repeat the sequence 3 times a day (8 hours).

As illustrated, these requirements can be met by using four trigger blocks. A first and a third trigger block are identical and for this reason only depicted once. A second trigger block is used for the 30 seconds sampling. A fourth trigger block is used for handling logics, that is, closing the capturing (considering it done), when all three samplings are made.

Figure 8A:
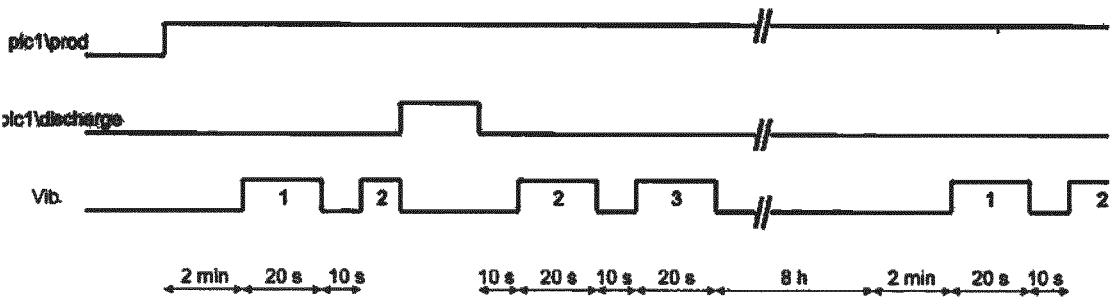
FIG. 8A-B illustrates a fourth case.
Figure 8B:
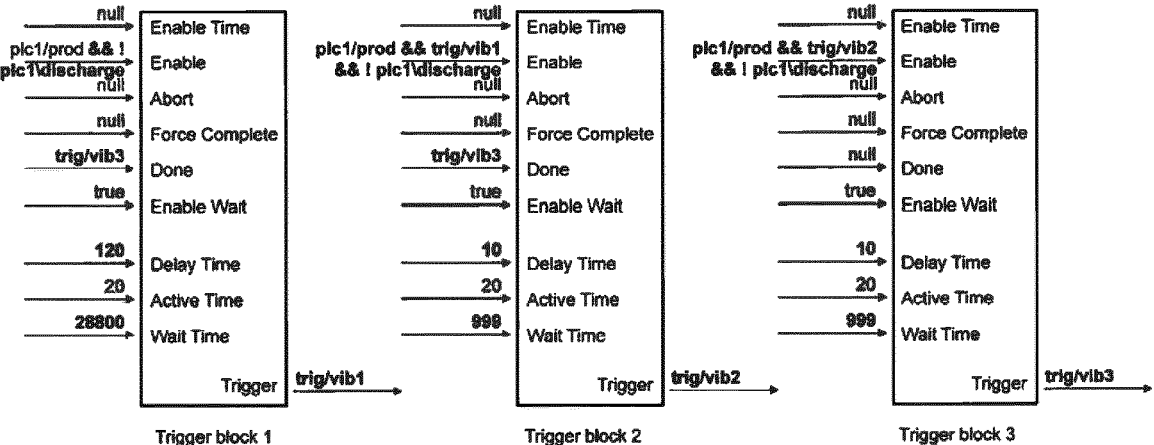

In a fourth case, illustrated in FIGS. 8A and 8B, the requirements are:

Acquire 3 vibrations in sequence of 20 seconds of sampling,

Wait 10 seconds between each vibration,

Acquire after 2 minutes of continuous production, symbol name "plc1/prod" and the symbol "plc1/discharge" must not be active, If the production drops or "plc1/discharge" become active
continue the sequence, and Repeat the sequence 3 times a day (8 hours).

As illustrated in FIG. 8B, three trigger blocks can be used for meeting these requirements. The Enable input parameter is set, in line with the requirements, such that the plc1/prod should be active and the plc1/discharge should be not active.

As illustrated in FIG. 5A-C, FIG. 6A-B, FIG. 7A-B and FIG. 8A-B by way of example, the trigger blocks can be combined in different ways to meet a variety of different requirements on how sampling should be performed. The fact that the trigger block is a relatively simple building block provides for that this easily can be adapted according to different interfaces and programming language.

Even though not illustrated, the trigger signal may be used for notifying an operator that a certain task is to be performed, e.g. capture a package sample and perform a number of pre-determined tests.

Figures 9, 10:
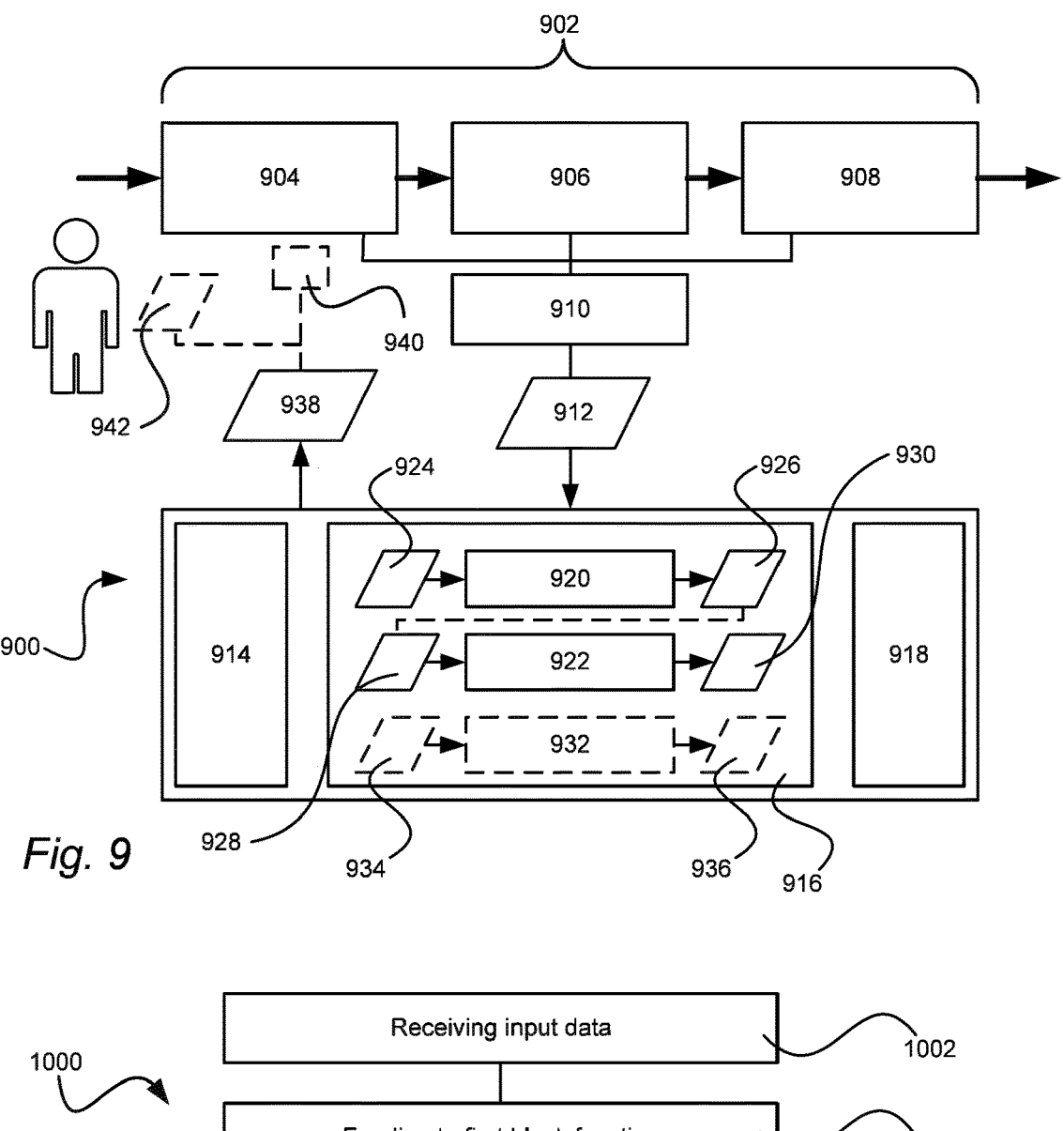
FIG. 9 illustrates schematically a system for handling sampling in a food handling line.
FIG. 10 is a flowchart illustrating steps of a method for processing the input data received from the food handling line to determine the trigger data 938 for sampling

FIG. 9 illustrates schematically a system 900 for handling sampling in a food handling line 902. As illustrated by way of example, the food handling line 902 may comprise three units, such as a filling machine 904, an accumulator 906 and a piece of downstream equipment 908, such as a cardboard packer. The food handling line 902 may be communicatively connected to a line controller 910 such that data from the food handling line 902 can be captured. At least part of the data captured can be transmitted to the system 900 as input data 912.

The input data 912 can be received by a transceiver 914. The system 900 can also comprise a processor 916 and a memory 918. The processor 916 can comprise a first trigger block function 920 and a second trigger block function 922, that is, for instance, implementations of the trigger block illustrated in FIG. 2. The first trigger block function 920 can be configured to receive first input parameter data 924, which may form part of the input data 912, and to output first output parameter data 926. Similarly, the second trigger block function 922 can be configured to receive second input parameter data 928, which can form part of the input data 912, and to output second output parameter data 930. As illustrated above, in some cases, the second input parameter data 928 can comprise the first output parameter data 926. In addition, a third trigger block function 932 can be used. This may be configured to receive third input parameter data 934, which may form part of the input data 912, and output third output parameter data 936.

The first and second output parameter data 926, 930 can be combined into trigger data 938 that may be transmitted to a device 940 such that e.g. vibration data, as explained above, can be captured. In case the third trigger block function 932 is used, the third output parameter data 936 can also form part of the trigger data 938. Additionally, or alternatively, the trigger data 938 can be used to render a notification 942 to an operator. The notification 942 may for instance comprise an instruction to capture a package sample and perform a series of tests.

FIG. 10 is a flowchart illustrating steps of a method 1000 for processing the input data 912 received from the food handling line 902 to determine the trigger data 938 for sampling. The method may comprise a first step 1002 for receiving the input data 912, wherein the input data 912 can comprise the first input parameter data 924 and second input parameter data 928. A second step 1004 for feeding the first input parameter data 924 to the first trigger block function (920). A third step 1006 for executing the first trigger block function 920 such that first output parameter data 926 is generated. A fourth step for feeding 1008 the second input parameter data 928 to the second trigger block function 922. A fifth step for executing 1010 the second trigger block function 922 such that the second output parameter data 930 is generated. A sixth step 1012 for combining 1012 the first output parameter data 926 and the second output parameter data 930 into the trigger data 938. Even though described in a certain order, other orders or having some of steps being performed in parallel are equally possible.

From the description above follows that, although various embodiments of the invention have been described and shown, the invention is not restricted thereto, but may also be embodied in other ways within the scope of the subject-matter defined in the following claims.

One or more embodiments as previously described may thus relate to a food handling line or plant, e.g. a food processing line or plant for pasteurization or homogenization and/or a food packaging line or plant for filling pourable food products into composite packages, wherein the filling plant is configured to form the composite packages from a multilayer composite packaging material and to fill the composite packages with the pourable food product. The food handling plant comprises a system 900 for processing input data 912 received from the food handling line 902 to determine trigger data 938 for adjusting operation of one or more devices, e.g. device 940, comprised in the food handling line 902. The input data may comprise one or more predetermined values and/or data received from one or more devices comprised in the food handling line, e.g. sensors.

The food handling line 902 may comprise a control device configured to control operation of the one or more devices 940 as a function of the trigger data. For example, the control device may be configured to drive one or more sensors and/or actuating devices and/or to display alerts to a user on a user interface as a function of the trigger data. For example, the sensor may be configured to measure mechanical vibrations and the sampling of the sensor may be initiated by the trigger data 938.

The system comprises a transceiver (914), a processor (916) and a memory (918), wherein the transceiver (914) is configured to receive the input data (912), e.g. indicative of operation of one or more devices of the food handling line, and transmit the trigger data (938), e.g. commands for adjusting operation of one or more devices of the food handling line.

The processor is configured to execute:

a first trigger block function (920) configured to receive first input parameter data (924) and transmit first output parameter data (926), a second trigger block function (922) configured to receive second input parameter data (928) and transmit second output parameter data (930), and wherein the input data (912) comprises the first input parameter data (924) and the second input parameter data (928), and the trigger data (940) comprises the first output parameter data (926) and the second output parameter data (930).

The second input parameter data 928 may comprise at least part of the first output parameter data 926. This way, the trigger block functions may be cascaded.

The (first, second and/or third) trigger block functions 920, 922, 932 may comprise, i.e. implement, one or more finite state machines comprising a plurality of states. A transition between states is a function, e.g. solely, of the input data. Optionally, the trigger data is a result of the transition between states and/or of a current state of the finite state machine.

The operation of the (first, second and third) trigger block functions is modifiable, e.g. solely, as a function of the input data. Advantageously, this permits the trigger block function to be easily adaptable to the different applications without a need to modify the building blocks of the trigger block functions and the implemented finite state machine.

In one or more embodiments, the processor 916 of the food handling line is further configured to execute a third trigger block function 932 configured to receive third input parameter data 934 and transmit third output parameter data 936, and wherein the input data 912 comprises the first input parameter data 924, the second input parameter data 928 and third input parameter data 934, and the trigger data 938 comprises the first output parameter data 926, the second output parameter data 930 and the third output parameter data 936.

The third trigger block function may comprise, i.e. implement, a finite state machines comprising a plurality of states as previously discussed with reference to the first and second trigger block functions.

The first, second and third input parameter data 924, 928, 934 comprise Enable, a Boolean operator, which if set to true switches state from Off to Starting, Abort, a Boolean operator, which if set to true switches state to Off, Force Complete, a Boolean operator, which if set to true switches from Active to Complete, Done, a Boolean operator, which if set to true switches state from Complete to Wait, Delay Time, an integer, which sets delay from Starting to Active, Active Time, an integer, which sets delay from Active to Complete, and Wait Time, an integer, which sets delay from Complete to Off.

In one or more embodiments, the first and second input parameter data 924, 928 comprise at least part of the third output parameter data 936. The third output parameter data 936 may force the first and second trigger block functions 920, 922 in a state Complete, the state Complete being indicative of a conclusion of a cycle of operation of the finite state machine.

The one or more devices 940 may comprise a sensor 940, wherein the trigger data 938 initiates a sampling of the sensor 940. The sensor 940 may be configured to measure mechanical vibrations. The one or more devices may comprise a user interface configured to display a notification 942 and wherein the trigger data 938 comprises the notification 942.

One or more embodiments may relate to a method 1000 for processing input data 912 received from a food handling line 902 according to one or more embodiments as previously disclosed, to determine trigger data 938 for adjusting operation of one or more devices 940 of the food handling line 902. The method comprises:

receiving 1002 the input data 912, wherein the input data 912 comprises first input parameter data 924 and second input parameter data 928, feeding 1004 the first input parameter data 924 to a first trigger block function 920, executing 1006 the first trigger block function 920 such that first output parameter data 926 is generated, feeding 1008 the second input parameter data 928 to a second trigger block function 922, executing 1010 the second trigger block function 922 such that second output parameter data 930 is generated, and combining 1012 the first output parameter data 926 and the second output parameter data 930 into the trigger data 938.

The first and second input parameter data (924, 928) may comprise

Enable, a Boolean operator, which if set to true switches state from Off to Starting, Abort, a Boolean operator, which if set to true switches state to Off, Force Complete, a Boolean operator, which if set to true switches from Active to Complete, Done, a Boolean operator, which if set to true switches state from Complete to Wait, Delay Time, an integer, which sets delay from Starting to Active, Active Time, an integer, which sets delay from Active to Complete, and Wait Time, an integer, which sets delay from Complete to Off.

The method may further comprise executing a third trigger block function 932 configured to receive third input parameter data (934) and transmit third output parameter data (936), and wherein the input data (912) comprises the first input parameter data (924), the second input parameter data (928) and third input parameter data (934), and the trigger data (938) comprises the first output parameter data (926), the second output parameter data (930) and the third output parameter data (936).

The first, second and/or third trigger block functions 920, 922, 932 may comprise, e.g. implement, a finite state machine comprising a plurality of states, preferably states Off, Starting, Active, Complete, and Wait, wherein the method comprises:

transitioning between states of the finite state machine, e.g. solely, as a function of the input data 912, and/or generating the trigger data as a result of the transition between states and/or of a current state of the finite state machine.

The first and second input parameter data 924, 928 comprise at least part of the third output parameter data 936.

The method may further comprise forcing the first and second trigger block functions 920, 922 in a state Complete as a function of the third output parameter data, the state Complete being indicative of a conclusion of a cycle of operation of the finite state machine.

One or more embodiments may further relate to a computer program product comprising instructions for implementing a method according to one or more embodiments, wherein said computer program is stored on a computer-readable medium.

In other words, one or more embodiments may relate to a computer program product, loadable in the memory of at least one electronic control unit, and comprising software code portions for executing the steps of a method according to one or more embodiments.

The invention claimed is:

1. A food handling line, comprising:

a system for processing input data received from the food handling line to determine trigger data for adjusting operation of one or more devices of the food handling line, said system comprising a transceiver, a processor and a memory;

wherein the transceiver is configured to receive the input data and transmit the trigger data;

wherein the processor is configured to execute a first trigger block function that receives first input parameter data and transmits first output parameter data, and a second trigger block function that receives second input parameter data and transmits second output parameter data; and wherein the input data comprises the first input parameter data and the second input parameter data, and the trigger data comprises the first output parameter data and the second output parameter data, wherein the one or more devices comprise a sensor, wherein the trigger data initiates a sampling of the sensor, wherein the first and second input parameter data comprise:
  Enable, a Boolean operator, which if set to true switches state from Off to Starting,
  Abort, a Boolean operator, which if set to true switches state to Off,
  Force Complete, a Boolean operator, which if set to true switches from Active to Complete,
  Done, a Boolean operator, which if set to true switches state from Complete to Wait,
  Delay Time, an integer, which sets delay from Starting to Active,
  Active Time, an integer, which sets delay from Active to Complete, and
  Wait Time, an integer, which sets delay from Complete to Off.

2. The food handling line according to claim 1, wherein the second input parameter data comprises at least part of the first output parameter data.

3. The food handling line according to claim 1, wherein the first and second trigger block functions each comprise a finite state machine comprising a state selected from the group consisting of Off, Starting, Active, Complete, and Wait.

4. The food handling line according to claim 3, wherein:
  a transition between states is a function of the input data, and/or
  the trigger data is a result of the transition between states and/or of a current state of the finite state machine.

5. The food handling line according to claim 1, wherein the processor is further configured to:
  execute a third trigger block function that receives a third input parameter data and transmits a third output parameter data; and
  wherein the input data comprises the first input parameter data, the second input parameter data and the third input parameter data, and the trigger data comprises the first output parameter data, the second output parameter data and the third output parameter data.

6. The food handling line according to claim 5, wherein the first and second input parameter data comprise at least part of the third output parameter data.

7. The food handling line according to claim 1, wherein the sensor is configured to measure mechanical vibrations.

8. The food handling line according to claim 1, wherein the one or more devices comprise a user interface configured to display a notification and wherein the trigger data comprises the notification.

9. The food handling line according to claim 1, wherein the food handling line comprises a food processing line and/or a food packaging line.

10. A method for processing input data received from a food handling line to determine trigger data for adjusting operation of one or more devices of the food handling line, wherein the one or more devices comprise a sensor, said method comprising:
  receiving, via a transceiver of a system for processing the input data, the input data, wherein the input data comprises a first input parameter data and a second input parameter data, wherein the system comprises the transceiver, a processor, and a memory;
  feeding, via the processor, the first input parameter data to a first trigger block function;
  executing, via the processor, the first trigger block function such that first output parameter data is generated;
  feeding, via the processor, the second input parameter data to a second trigger block function;
  executing, via the processor, the second trigger block function such that second output parameter data is generated; and
  combining, via the processor, the first output parameter data and the second output parameter data into the trigger data,
  transmitting, via the transceiver, the trigger data to the sensor to initiate a sampling of the sensor,
  wherein the first and second input parameter data comprise:
    Enable, a Boolean operator, which if set to true switches state from Off to Starting,
    Abort, a Boolean operator, which if set to true switches state to Off,
    Force Complete, a Boolean operator, which if set to true switches from Active to Complete,
    Done, a Boolean operator, which if set to true switches state from Complete to Wait,
    Delay Time, an integer, which sets delay from Starting to Active,
    Active Time, an integer, which sets delay from Active to Complete, and
    Wait Time, an integer, which sets delay from Complete to Off.

11. The method according to claim 10, wherein the second input parameter data comprises at least part of the first output parameter data.

12. The method according to claim 10, wherein:
  the one or more devices comprise a user interface and the method comprises displaying on the user interface a notification, wherein the trigger data comprises said notification.

13. A non-transitory computer-readable medium comprising instruction stored thereon, that when executed on a processor, perform the steps of a method according to claim 10.

* * * * *